L. JOHNSTONE, DEC'D.
W. B. PRITCHARD, THE YOUNGER, EXECUTOR.
SPRING WHEEL.
APPLICATION FILED AUG. 4, 1908.
1,006,384.
Patented Oct. 17, 1911.
3 SHEETS—SHEET 1.
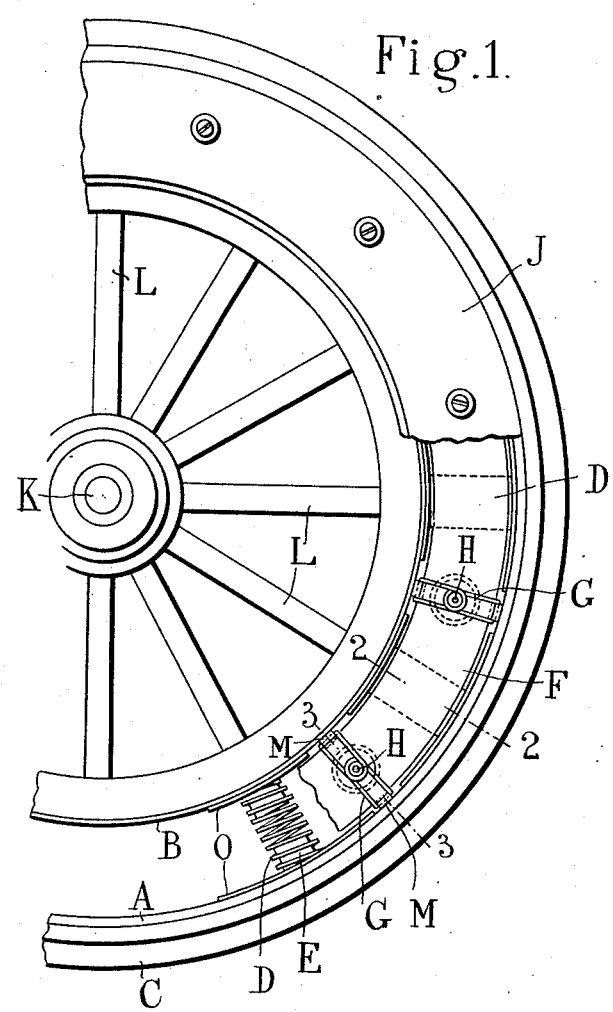
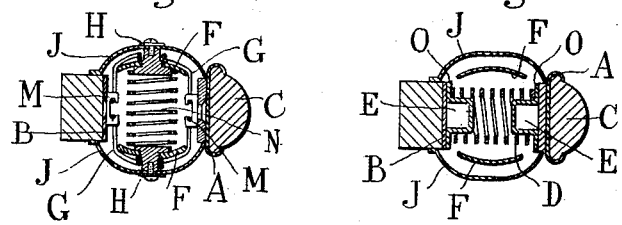

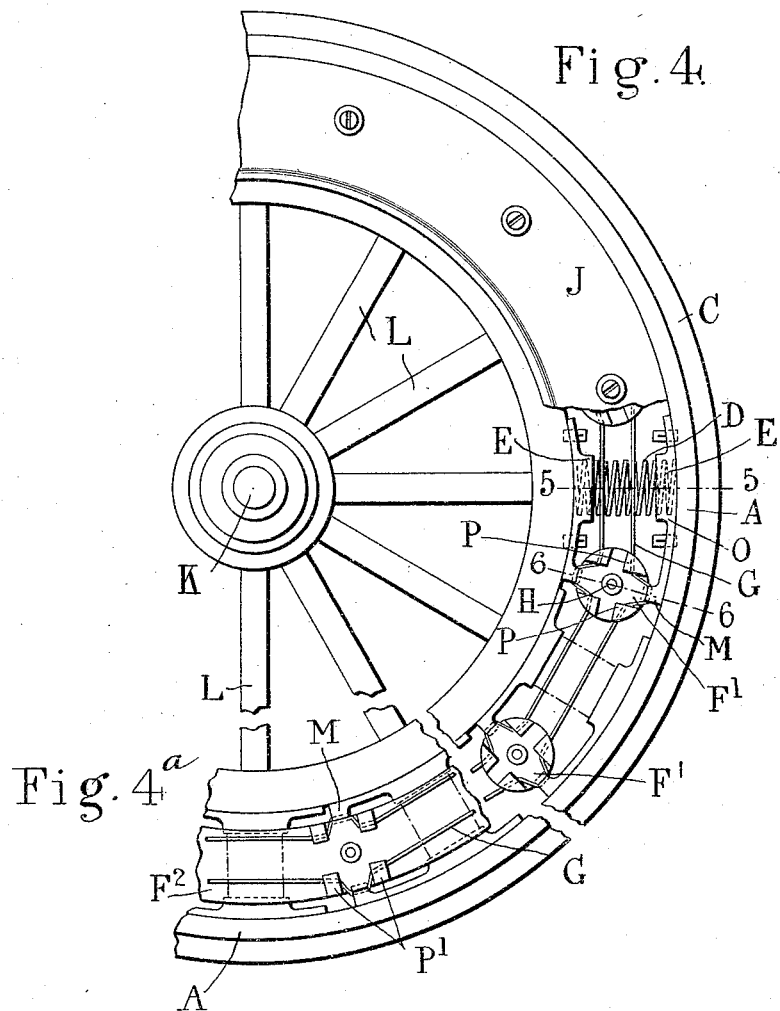

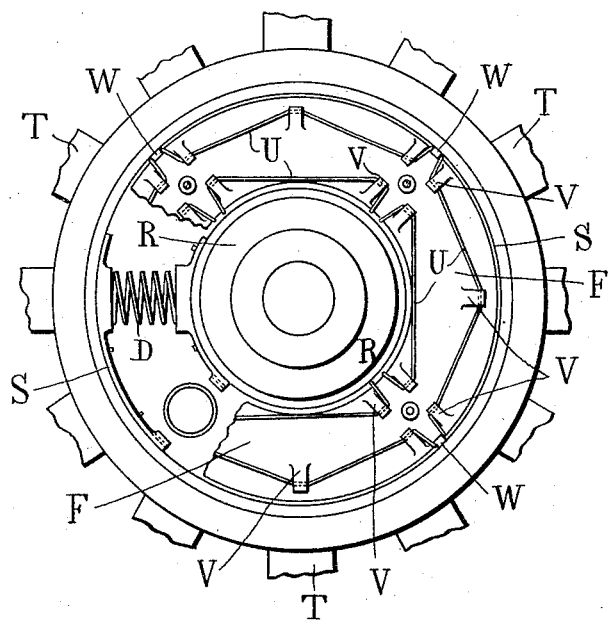

UNITED STATES PATENT OFFICE.

LEWIS JOHNSTONE, OF CHESTER, ENGLAND, ASSIGNOR OF ONE-THIRD TO WILLIAM BRIDGETT PRITCHARD AND ONE-THIRD TO HAROLD PORTER MELLOR, BOTH OF MANCHESTER, ENGLAND; WILLIAM BRIDGET PRITCHARD, THE YOUNGER, EXECUTOR OF SAID LEWIS JOHNSTONE, DECEASED.

SPRING-WHEEL.

1,006,384.      Specification of Letters Patent.      Patented Oct. 17, 1911.

Application filed August 4, 1908. Serial No. 446,963.

*To all whom it may concern:*

Be it known that I, LEWIS JOHNSTONE, scientist, a subject of the King of Great Britain, residing at 37 Hoole road, Chester, England, have invented certain new and useful Improvements in Spring-Wheels, of which the following is a specification.

This invention relates to wheels or wheel rims or wheel hubs pulleys or the like and primarily to vehicle wheels of the type known as "spring wheels" for road vehicles, or my invention may be utilized for any other wheels hubs pulleys drums or the like to which same may be applicable as for example my present invention may, if desired, be employed in wheels, hubs, drums or pulleys for driving belts or bands in the transmission of power (all of which for the sake of brevity I will hereinafter refer to and include in the term "wheel") and has for its objects (*inter alia*) to produce a wheel resilient in the direction of its vertical plane combined with lateral stability and tractive efficiency while practically avoiding all frictional contact between the various parts or reducing any such frictional contact to a minimum.

According to this invention, two concentric rings or rims (of any suitable size and character) are employed and normally held spaced apart in concentric position relatively to one another by suitable springs, which may be radially disposed spiral springs spaced-apart all around the wheel, in conjunction with which I employ "floating" side flanges or side rings (each made in one piece or built up of sections) oppositely disposed with transverse or horizontally acting springs thereinbetween said floating rings or flanges being held firmly compressed toward one another (against the action of said transverse springs) by means of a radially or more or less tangentially disposed flexible ties (such as wire ropes or the like) which are attached to the said rims and to said floating side flanges in suchwise as to transmit tractive power therethrough and to permit relative vertical movement between the said concentric ring or rims while preventing or tending to prevent lateral displacement of one rim relatively to the other.

The following is one manner of carrying my present invention into practice in a wheel for road vehicles:—I employ two stout concentric rims both of which may be flat in cross-section on the outer circumference thereof and may be strengthened in any way desired on the inner circumference and the outer rim may if desired, be adapted to receive a suitable tire. Between these two rims I mount a series of stout and strong spiral springs which are forced in—and held under some compression in—between said rims all around; any suitable means being provided to hold each said spring in position such for example as snugs, shallow pockets, etc. On the opposite sides of the annular space inclosed between the two said concentric rings I employ two floating rings or flanges (which may each be an endless ring or may be made in sections) the external diameters of which floating rings are less than the internal diameter of the outer concentric rim; and the internal diameter of which floating rings is greater than the external diameter of the inner concentric rim. These floating rings or flanges are advantageously of crescent form in cross-section, for example same may be convex or otherwise suitably rounded on the exterior and concave or hollow on the interior with any suitable means provided to hold or assist in holding a series of transversely disposed springs which are held in compression between said flanges in suchwise as to strongly force said floating flanges apart or tend so to do. Neither these transversely acting springs nor the floating flanges touch the aforesaid vertically acting springs or touch the aforesaid concentric rims. These said floating flanges (with the transversely acting springs thereinbetween) are held in position oppositely disposed and on opposite sides of the space between the concentric rims by means of flexible ties such as flexible metal bands or wire strands cord or rope which pass radially or more or less tangentially from the inner rim to the outer rim over the curved exterior surface of said floating ring on or to which latter said flexible ties are secured in any suitable manner.

In the figures of the accompanying drawings there are shown different methods of carrying this invention into practice *i. e.* wheels to which are applied different modifications of my invention.

Figure 1 shows a portion of a wheel in side view. Fig. 2 is a section through line 2—2 of Fig. 1. Fig. 3 is a section through line 3—3 of Fig. 1. Fig. 4 shows a side elevation of a fragment of a spring wheel embodying this invention in which the floating flange is divided into separate parts or plates connected by flexible ties. Fig. 4ª represents a side elevation of a fragment of a spring wheel embodying one form of this invention in which the floating flange is continuous and connected to the rim and ring by the flexible ties. Fig. 5 is a section along the line 5—5 of Fig. 4. Fig. 6 is a section along the line 6—6 of Fig. 4. Fig. 7 is a side view of the hub or central part of a wheel or pulley showing the present invention applied to hubs or pulleys.

Referring now to these Figs. 1 to 6 in greater detail wherein the same letters and numerals indicate the same or corresponding parts throughout, in Figs. 1 2 and 3 A is the outer rim—and B the inner rim or ring concentric with rim A of a wheel whose hub is K, D being spiral springs arranged radially between the rims A and B viz. one spring D opposite each spoke L. The springs are attached to plates O which have columns E to support the springs D. The rim A has inwardly turned flanges (see Figs. 2 and 3) adapted to hold the rubber tire C; or the rubber tire or any other tire may be mounted in any other desired manner on the rim A or the latter may be used as a plain metal tire. F F are lateral floating flanges occupying positions between—but to each side of—the rims A and B. The flanges F F are held in position and attached to the rims A and B by flexible ties or metallic bands G; and between the said flanges F F alternating with and at right angles to the radially disposed springs D are cross-springs N which normally, in compression, tend to press the flanges F F away from each other. M M are ears or lugs fixed to the rim A; and H H are pins or projections on the flanges F F; the ties G being arranged around the ears M M and the projections H H as shown. J is an outer shrouding of leather or any suitable flexible material which is attached to the rim A and inner rim B respectively and envelops the flanges F F to which same may if desired, be attached at the points H H.

Referring now to Figs. 4 5 and 6:—these figures show a somewhat different method of attaching the ties G. The various parts of these figures will be readily followed by a reference to the description given above of Figs. 1 to 3; which description applies equally in this case with the following exceptions. In Fig. 4 the floating flanges marked F¹ F¹ consist of a series of oppositely disposed plates connected together only by the flexible ties G, and between which are the springs N, thus forming on each side what may be called a discontinuous flange. In Fig. 4ª the floating flanges F² are continuous and provided on opposite edges with lugs P¹, and flexible ties G passing over said lugs P¹ and over the lugs M of the rim A and ring B, serve to connect said floating flanges with the latter. In Fig. 4 the plate O is somewhat modified, having cup-like receptacles E in which the springs D are located and also having lugs or ears M; the flanges whether in the form shown at F¹ or F² have four lugs or ears P or P¹ opposite each transverse spring N and the tie-bands G are arranged around the said ears or lugs M and P or P¹ as shown.

The above descriptions show only some modifications of my invention which is capable of being carried out and applied with other modifications as for example in the modification shown in Fig. 7. Referring now to Fig. 7:—the invention is here shown applied to the hub of a wheel namely:—the radially disposed spiral springs D (such as the springs D Figs. 1 to 6) are correspondingly mounted between the inner rim R of the hub and the outer rim S of the hub (these two rims R and S of the hub being normally concentric) and the spokes T affixed to the outer rim S; and the other parts of the wheel outside the rim S and inside the rim R being of the usual or any suitable constructions. The cross-springs N (such as the springs N shown in Figs. 1 to 6) are correspondingly mounted (as in Figs. 1 to 6) alternately with the said springs D, between the said concentric rims R and S; and these series of springs D and N are held in position and the cross-springs N normally held in compression in the same manner and by the same means or by any similar or equivalent means to those described with reference to the aforesaid Figs. 1 to 6, as for example by the ties U which pass through or under eyes or guides V on the outside of the floating flange F (and similarly on the opposite side) and then pass under or around ears or lugs W (corresponding to the lugs or ears M M (Figs. 1 to 3) formed or fixed on the inner rim R and outer rim S respectively.

The application of my invention to a pulley wheel would simply consist in substituting the ordinary or any suitable and known form of pulley rim (such as the usual flat iron rim or a ground rim) in place of the outer rim A of Figs. 1 to 6 or the outer rim S of the hub arrangement as in Fig. 7.

In fitting the component parts together or for effecting repairs or for taking the components apart, I may proceed as follows:—The inner and outer concentric rims are placed in position with the radially disposed or other springs placed in position between them; the floating flanges are then placed in position with the aforesaid horizontally acting springs between them, and said floating flanges are then compressed or forced toward one another to a greater extent than their normal position and this operation or overcompressing or forcing the floating flanges together may be effected by any suitable means such as a series of vises or clamps applied at suitable distances apart around the floating flanges or applied only at one or more points; or for this purpose I may advantageously employ what I term "service-bolts" with screw-nuts thereon which are passed from side to side right through suitable holes in said floating flanges and by means of the nuts screwed up thereon, the floating flanges are thereby forced toward one another as far as desired, i. e. closer together than in their normal position. The aforesaid ties can now be readily fixed or secured in position as aforesaid, and, when all is ready, the vises or clamps or service bolts, etc., are first slacked back and then removed entirely thereby allowing the floating flanges to be strongly forced apart by their springs against which tendency they are restrained by the ties which are thus held taut and all the components are thus brought into operative position for use. When it is desired to detach any of the components or open out same for repairs, cleaning, etc., the floating flanges are again further compressed toward one another by the aforesaid service bolts or clamps, etc., to thereby enable the ties to be unfixed or detached or removed and then the floating flanges (or any part thereof—when made in sections) can be released and removed and replaced, etc., and when all the components are again assembled they can be put together again and secured and the ties fitted and secured in position and the whole of the components secured together as before described.

What I claim is:—

1. In a spring wheel, the combination of an outer rim, an inner ring spaced therefrom, a series of springs placed between said rim and ring and yieldably holding them in spaced relation, a pair of lateral floating flanges one on each side of the space between said rim and ring, ties connecting each of said floating flanges with the rim and ring respectively, and springs between said flanges.

2. In a spring wheel, the combination of an outer rim, an inner ring spaced therefrom, a series of springs yieldably holding said rim and ring in spaced relation, a pair of lateral flanges one on each side of the space between said rim and ring, ties connecting each of said flanges with the adjacent edge of said rim and ring, and springs between said flanges tending to press the flanges away from each other.

3. In a spring wheel, the combination of an outer rim, an inner ring concentric therewith and spaced therefrom, a series of radially disposed springs placed between said ring and rim and yieldably holding them in spaced relation, a pair of annular floating flanges, one on each side of the space between said rim and ring, flexible ties connecting each of said floating flanges with the adjacent edge of said ring and rim respectively, transversely disposed springs interposed between said floating flanges and adapted to press them away from each other, and side covers each secured at its edges to the outer edge of said rim and ring respectively and secured intermediately of its edge to said floating flange.

In witness whereof I have hereunto set my hand in presence of two witnesses.

LEWIS JOHNSTONE.

Witnesses:
 WALTER R. SIMONS,
 W. J. SULIS.

---

Copies of this patent may be obtained for five cents each, by addressing the "Commissioner of Patents, Washington, D. C."